(12) United States Patent
Wood

(10) Patent No.: US 8,087,615 B2
(45) Date of Patent: *Jan. 3, 2012

(54) WINDOW INSTALLATION METHOD

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/893,223

(22) Filed: Sep. 29, 2010

(65) Prior Publication Data

US 2011/0016823 A1    Jan. 27, 2011

Related U.S. Application Data

(63) Continuation of application No. 11/714,456, filed on Mar. 5, 2007, now Pat. No. 7,823,833.

(51) Int. Cl.
*B64C 1/14*    (2006.01)

(52) U.S. Cl. ............... 244/129.3; 52/204.7; 52/204.69; 52/774; 296/190.1; 296/200

(58) Field of Classification Search ............... 244/129.3; 52/204.7, 204.69, 774; 296/190.1, 200
See application file for complete search history.

(56) References Cited

U.S. PATENT DOCUMENTS

| | | | |
|---|---|---|---|
| 1,073,805 A | 9/1913 | Kinnear | |
| 1,793,127 A | 2/1931 | Conrad | |
| 4,541,595 A | 9/1985 | Fiala et al. | |
| 5,271,581 A | 12/1993 | Irish | |
| 6,082,674 A | 7/2000 | White et al. | |
| 6,736,352 B2 | 5/2004 | Bladt et al. | |
| 6,786,453 B2 | 9/2004 | Jones | |
| 6,789,765 B2 | 9/2004 | Hopkins et al. | |
| 6,793,182 B2 | 9/2004 | Hopkins et al. | |
| 7,162,841 B2 | 1/2007 | Kownacki | |
| 2005/0082432 A1* | 4/2005 | Nordman | 244/129.3 |

FOREIGN PATENT DOCUMENTS

| | | |
|---|---|---|
| CH | 216 624 A | 9/1941 |
| EP | 0 287 692 A | 10/1988 |
| EP | 0 528 526 A | 2/1993 |
| GB | 952 029 A | 3/1964 |
| WO | WO 2005 115840 | 12/2005 |

OTHER PUBLICATIONS

International Search Report and Written Opinion of the International Searching Authority, Application No. PCT/US2008/052941, Mar. 7, 2008 (16 pgs).

* cited by examiner

*Primary Examiner* — J. Woodrow Eldred

(74) *Attorney, Agent, or Firm* — Toler Law Group, PC

(57) ABSTRACT

A particular method includes installing a window assembly in a structure by coupling a window frame body of the window assembly to a first surface of an interior side of an outer skin of the structure. The method also includes coupling the window frame body to a second surface of an interior side of an inner skin of the structure. The method also includes coupling the window frame body to a portion of the structure between the outer skin and the inner skin.

15 Claims, 14 Drawing Sheets

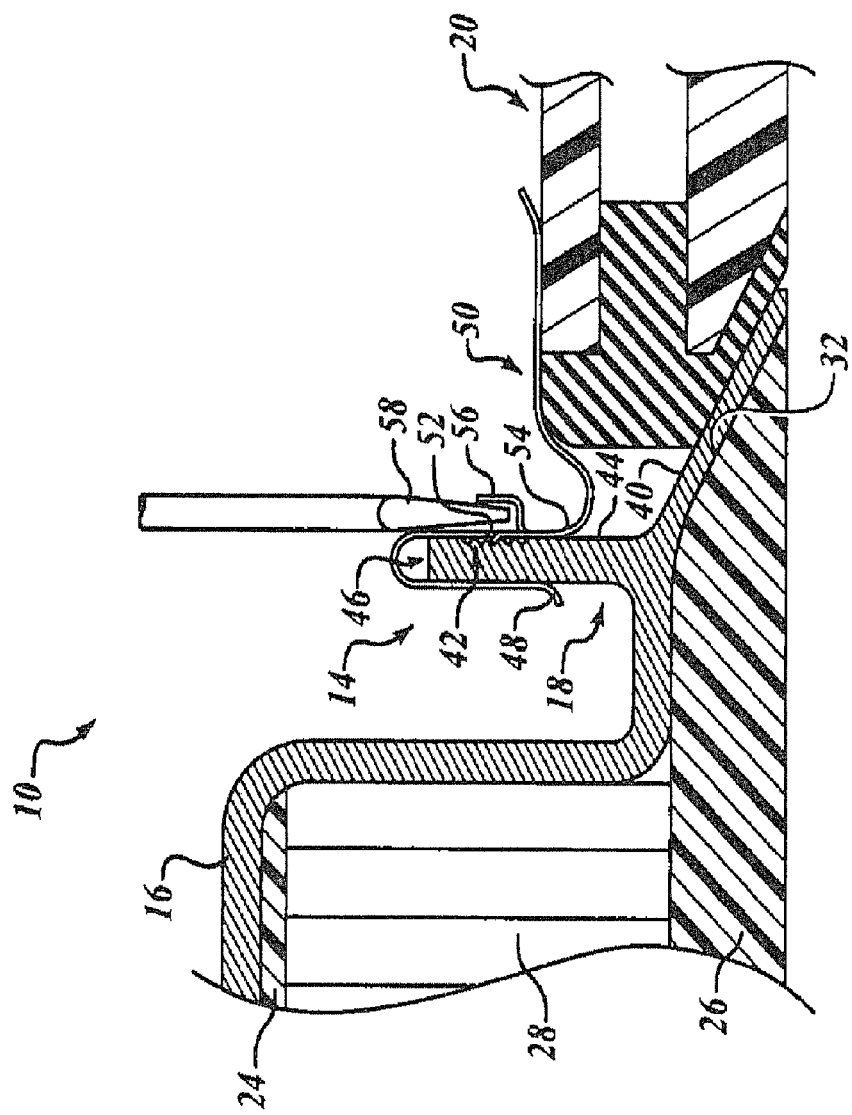

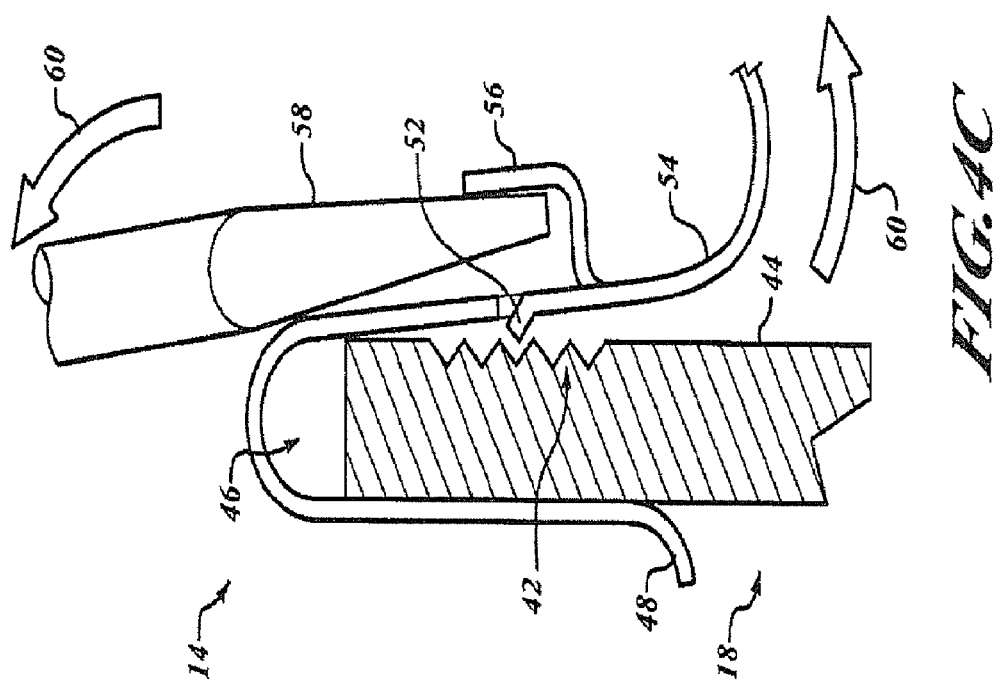

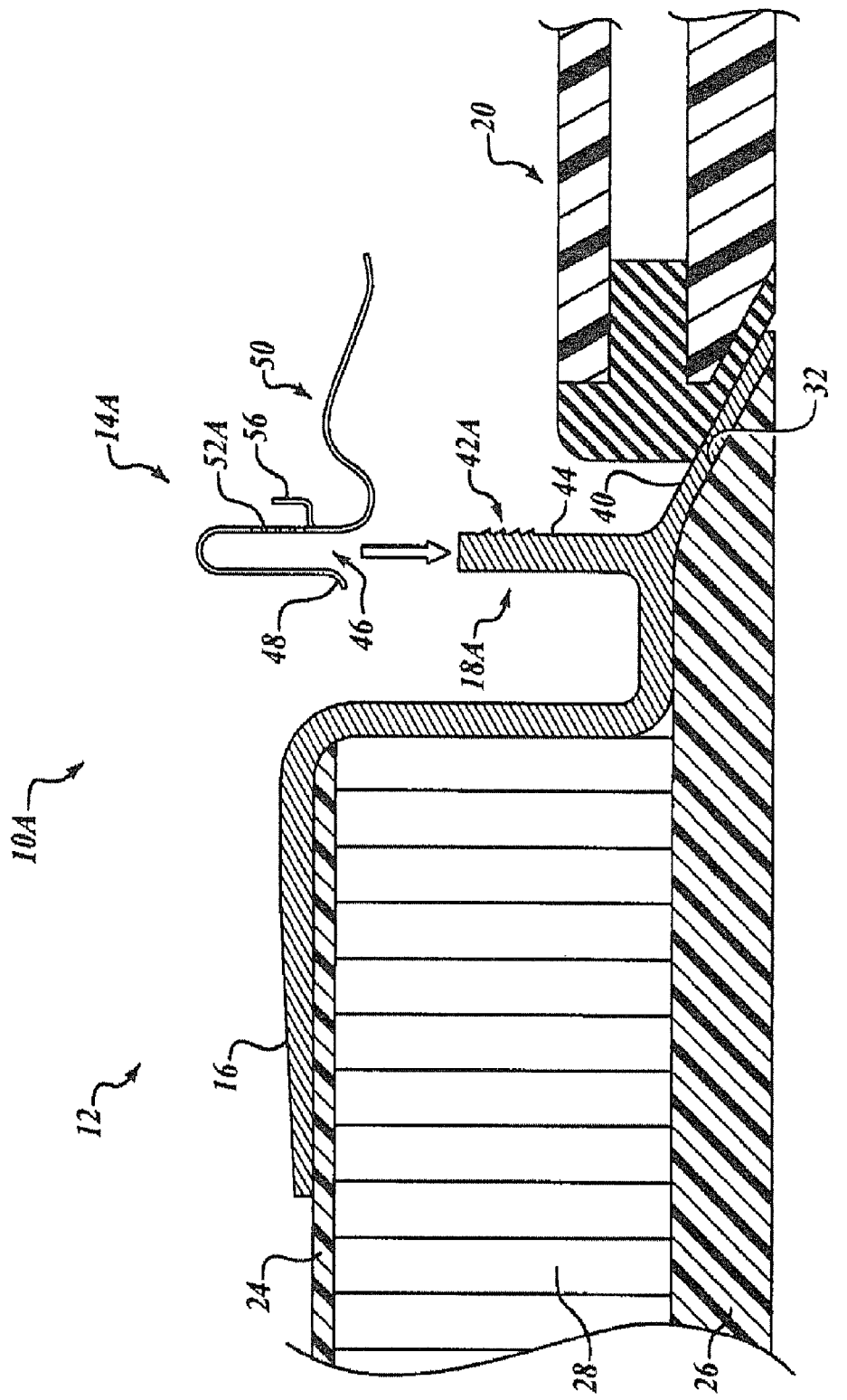

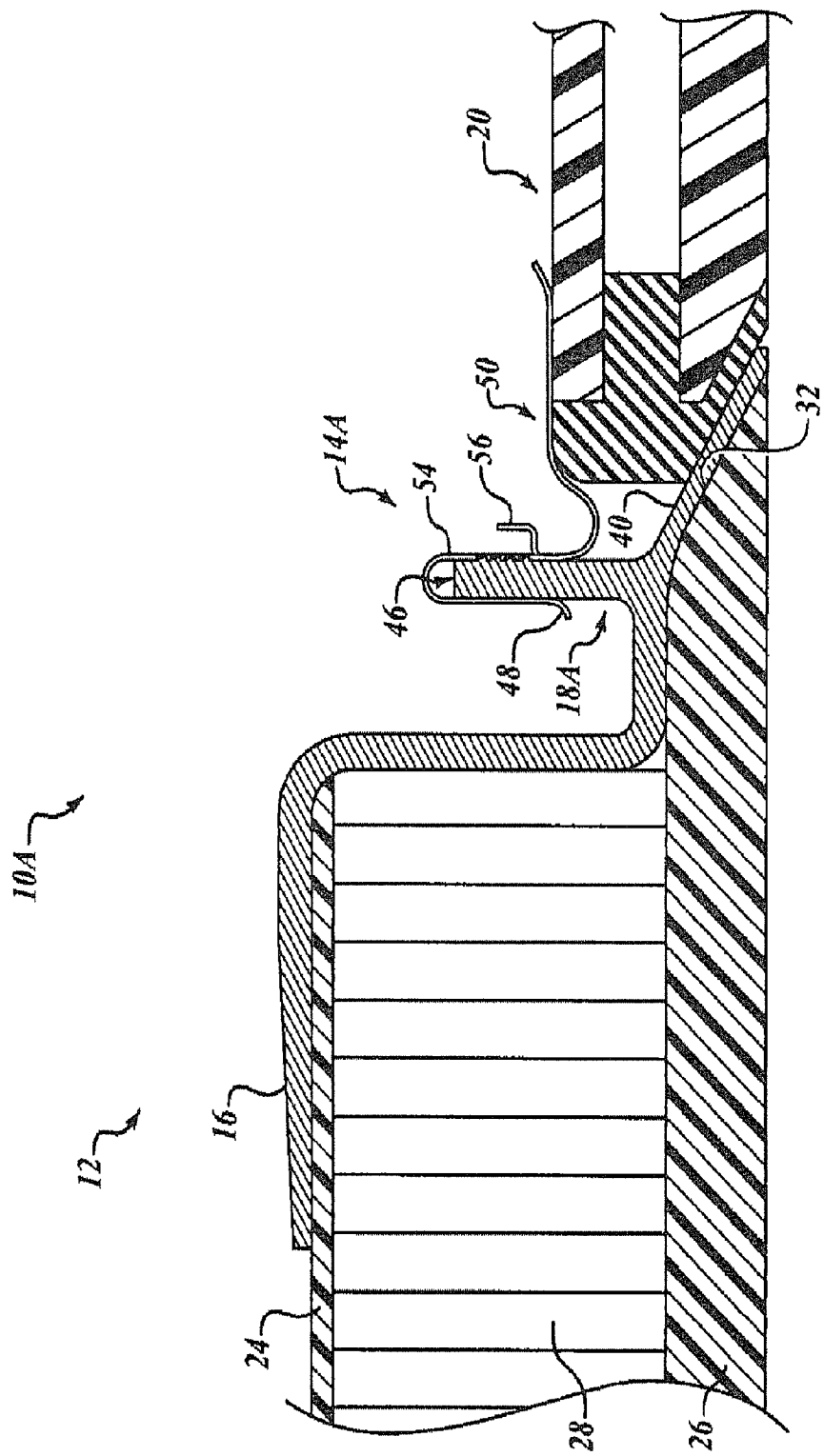

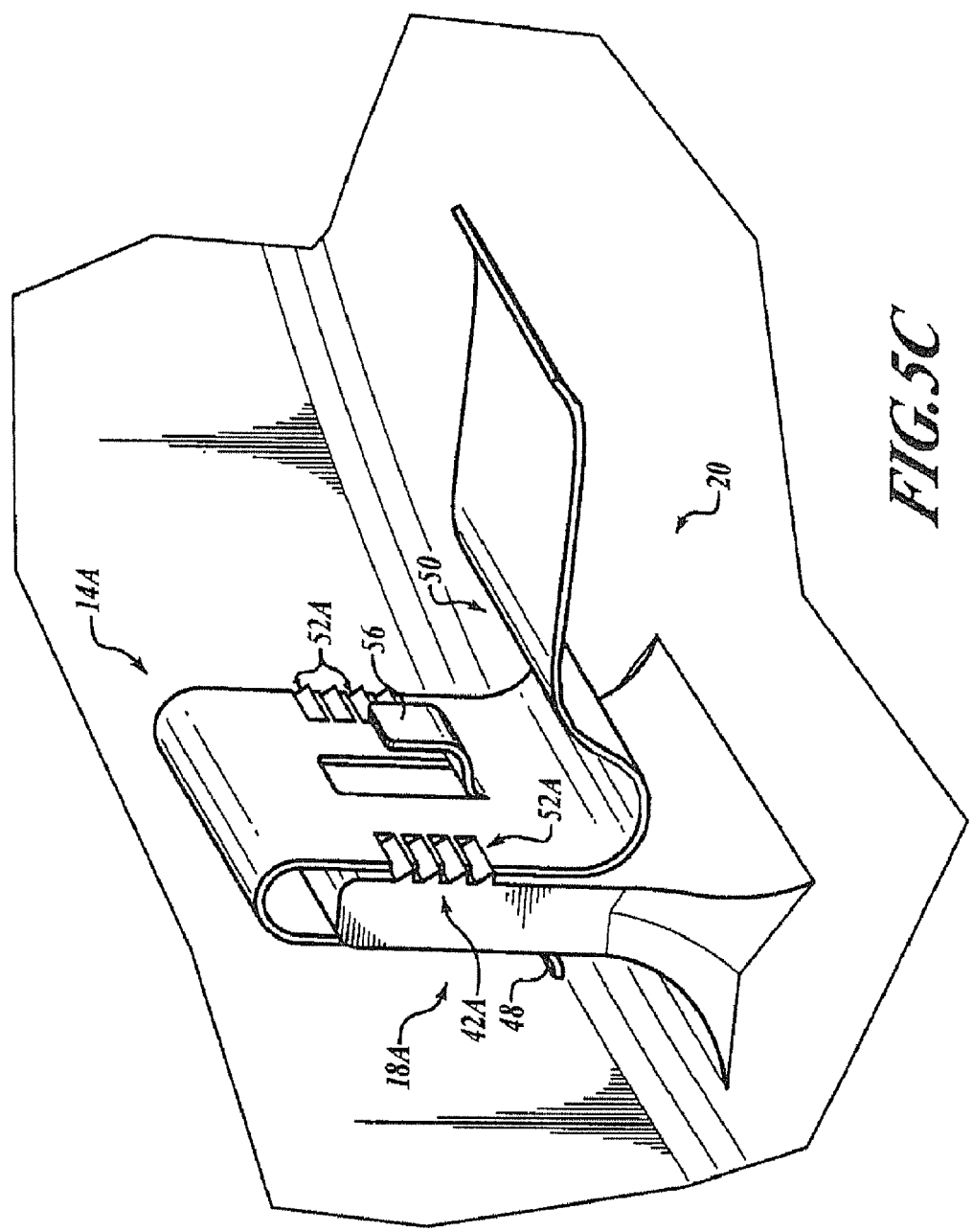

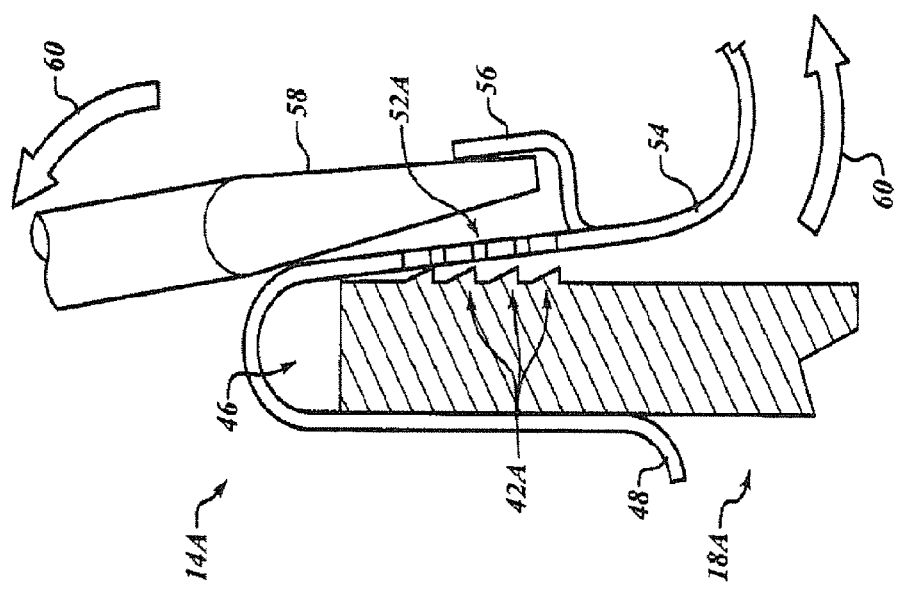

WINDOW INSTALLATION METHOD

CLAIM OF PRIORITY

This application is a continuation of and claims priority from U.S. patent application Ser. No. 11/714,456, filed on Mar. 5, 2007, which is incorporated herein by reference in its entirety.

BACKGROUND

Window assemblies are installed in a wide variety of structures to permit natural light to enter the structure, to permit occupants of the structure to view outside the structure and, sometimes, to permit viewing of the interior of the structure from the exterior of the structure. Window assemblies can also help isolate and protect the interior of the structure from the environment external to the structure. Such structures can include buildings and vehicles, such as land vehicles, maritime vessels, and aircraft.

In some cases, such as when the structure is an aircraft, the window assembly can be part of a pressure boundary to help maintain desired pressure inside the structure. In such a case, an aircraft window assembly may be installed in an aperture that has been excised from aluminum skin of an aircraft fuselage section.

However, in a departure from conventional aluminum aircraft skins and structure, honeycomb fuselage skins are being used in aircraft. This use of honeycomb fuselage skins is in keeping with a general desire to reduce aircraft weight. In aircraft with honeycomb fuselage skins, window apertures are excised after final cure of the fuselage honeycomb structure, thereby exposing internal honeycomb structures that entail sealing and closeout to resist moisture ingression.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

According to an exemplary embodiment, an exemplary window frame assembly includes a window frame and spring clips. The window frame includes a window frame body, and flanges extend from the window frame body. The spring clips are removably attachable to the flanges.

According to an aspect, each flange may define at least one first locking member and each spring clip may define at least one second locking member configured to engage the first locking member. As an example, the at least one first locking member may include saw tooth grooves and the at least one second locking member may include a pair of angled tabs. As another example, the at least one first locking member may include a pair of angled tabs and the at least one second locking member may include saw tooth grooves.

According to another aspect, each spring clip may further define a release mechanism that is configured to disengage the spring clip and the flange. For example, the release mechanism may include a tab.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A, 4B, and 4C illustrate further details of an exemplary embodiment of the window frame assembly of FIG. 1;

FIGS. 5A, 5B, and 5C illustrate details of another exemplary embodiment of the window frame assembly of FIG. 1; and FIGS. 6A, 6B, and 6C illustrate further details of the other exemplary embodiment of the window frame assembly of FIG. 1.

DETAILED DESCRIPTION

Figure 1:
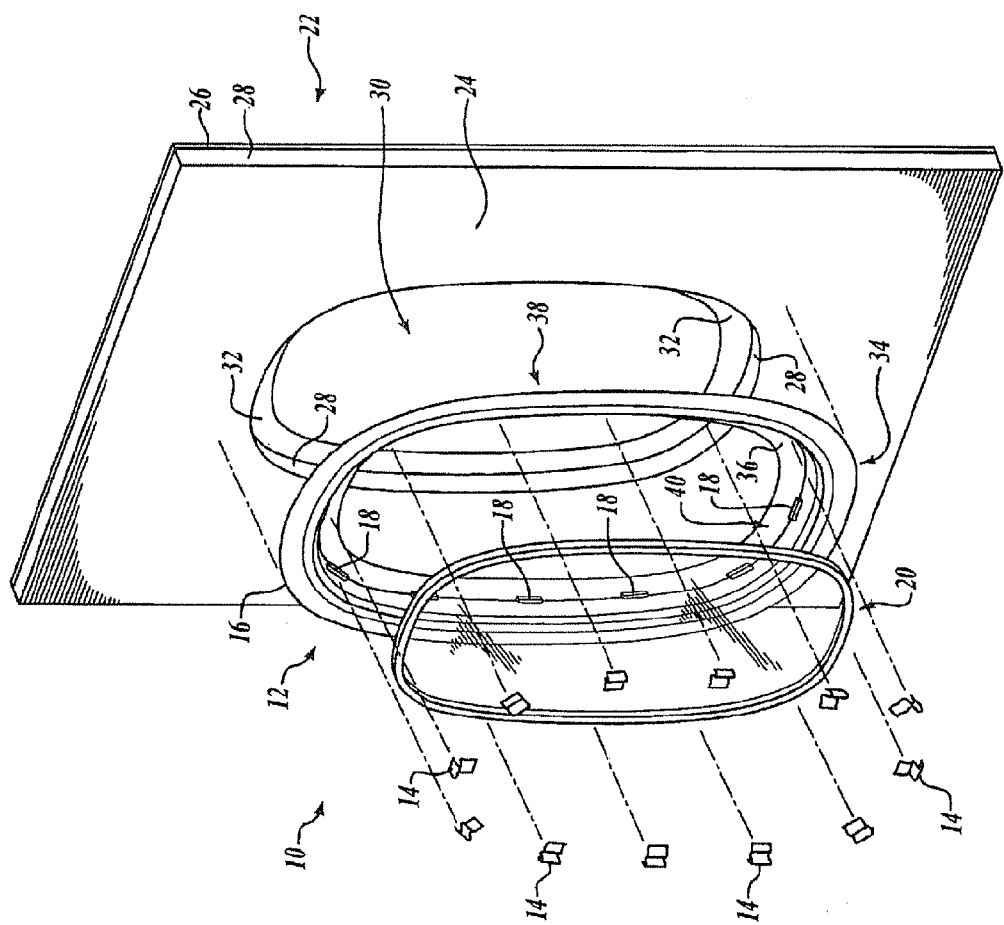
FIG. 1 is an exploded perspective view of an exemplary window frame assembly.

Given by way of non-limiting overview and referring to FIG. 1, an exemplary window frame assembly 10 includes a window frame 12 and spring clips 14. The window frame 12 includes a window frame body 16, and flanges 18 extend from the window frame body 16. The spring clips 14 are removably attachable to the flanges 18. A window assembly 20 may be removably retained in the window frame 12 by the spring clips 14. Details will be set forth below.

Still referring to FIG. 1, the window frame assembly 10 can be mounted within a structure 22. Given by way of non-limiting examples, the structure 22 can be without limitation a maritime vessel with porthole, land vehicle, interior or exterior building wall or roof whose aperture encases a window or skylight portal, or a fuselage of an aircraft. In an exemplary, non-limiting embodiment, the structure 22 suitably is an aircraft's honeycomb fuselage structure. In such an example, the structure 22 includes an inner skin 24, such as a composite laminate inner skin, an outer skin 26, such as a composite laminate outer skin, and internal honeycomb material 28 between the inner skin 24 and the outer skin 26.

The inner skin 24, the honeycomb material 28, and the outer skin 26 are excised, thereby defining an aperture 30 to provide visual access through the wall of the structure 22. The aperture 30 is smaller at the outer skin 26—that is, less of the outer skin 26 is excised than is the honeycomb material 28 and the inner skin 24. This arrangement provides a surface 32 against which the window frame 12 can bear and bond.

In an exemplary embodiment, the window frame 12 suitably is a metallic or composite window frame that is sized to intimately correspond to the cutout in the honeycomb material 28 and to nest against both the inner skin 24 and the outer skin 26 (at the surface 32). All interface surfaces between the window frame 12 and the structure 22 are adhesively bonded to obtain homogenous load carrying capability through the window frame assembly 10 as well as provide a sealed barrier over the honeycomb material 28 to prevent moisture ingression.

The window frame body 16 includes external surfaces that interface with the structure 22. A frame surface 34 is coincident to the surface of the cutout of the honeycomb material 28 and is bonded to the honeycomb material 28 with a suitable adhesive, like a two-part adhesive such as without limitation EA9394 paste adhesive. Approximately perpendicular to the surface 34 are surfaces 36 and 38. The surface 36 interfaces with the outer skin 26 at the surface 32 and the surface 38 interfaces with the inner skin 24. The same adhesive as described above suitably is applied to the surfaces 36 and 32 and to the surfaces 38 and 24 to bond them and to provide a seal against moisture. An interior of the surface 36 also serves as a sill 40 in which the window assembly 20 will bear against.

Figure 2A:
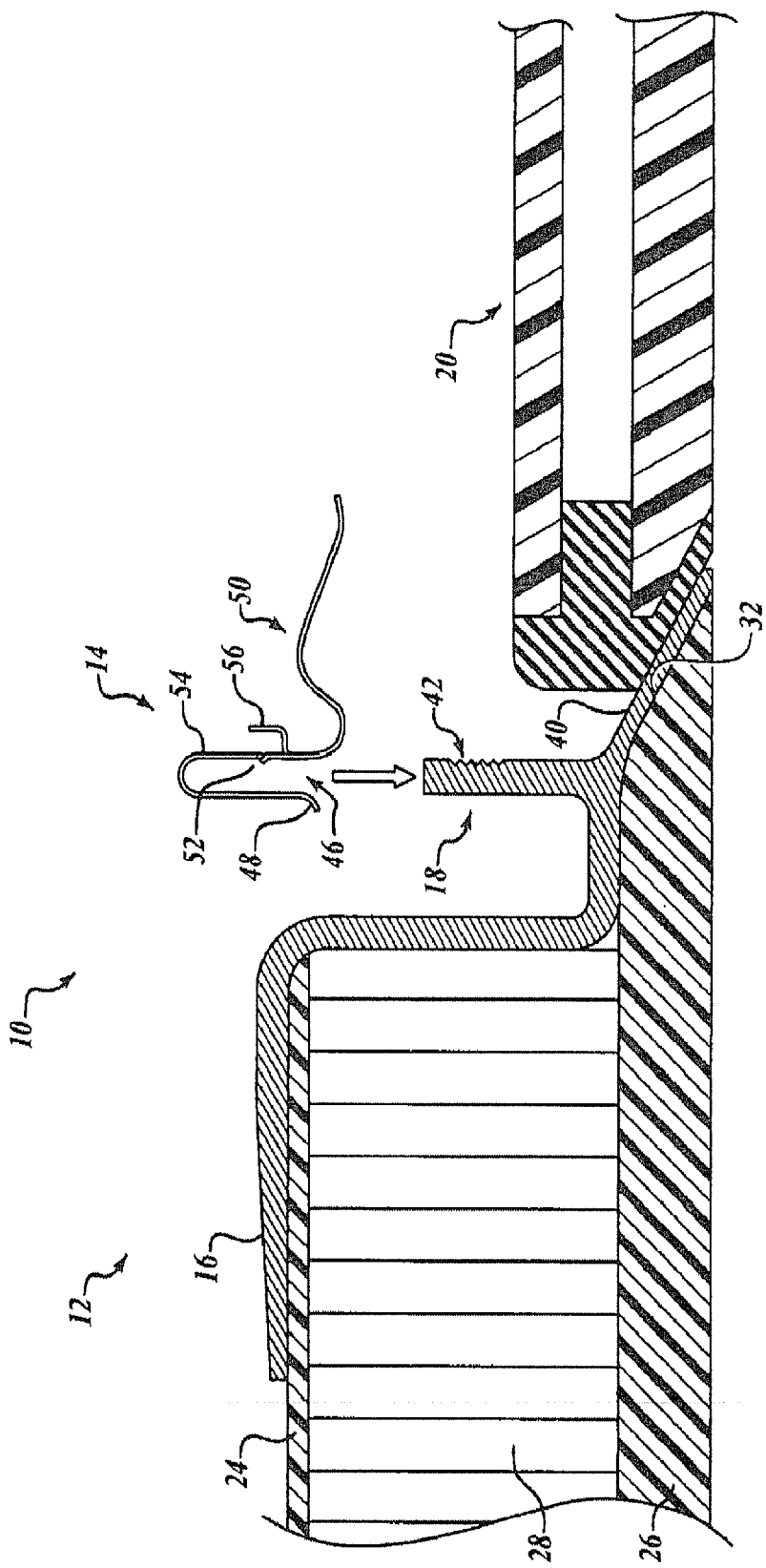
FIGS. 2A, 2B and 2C illustrate details of an exemplary embodiment of the window frame assembly of FIG. 1.
Figure 2B:
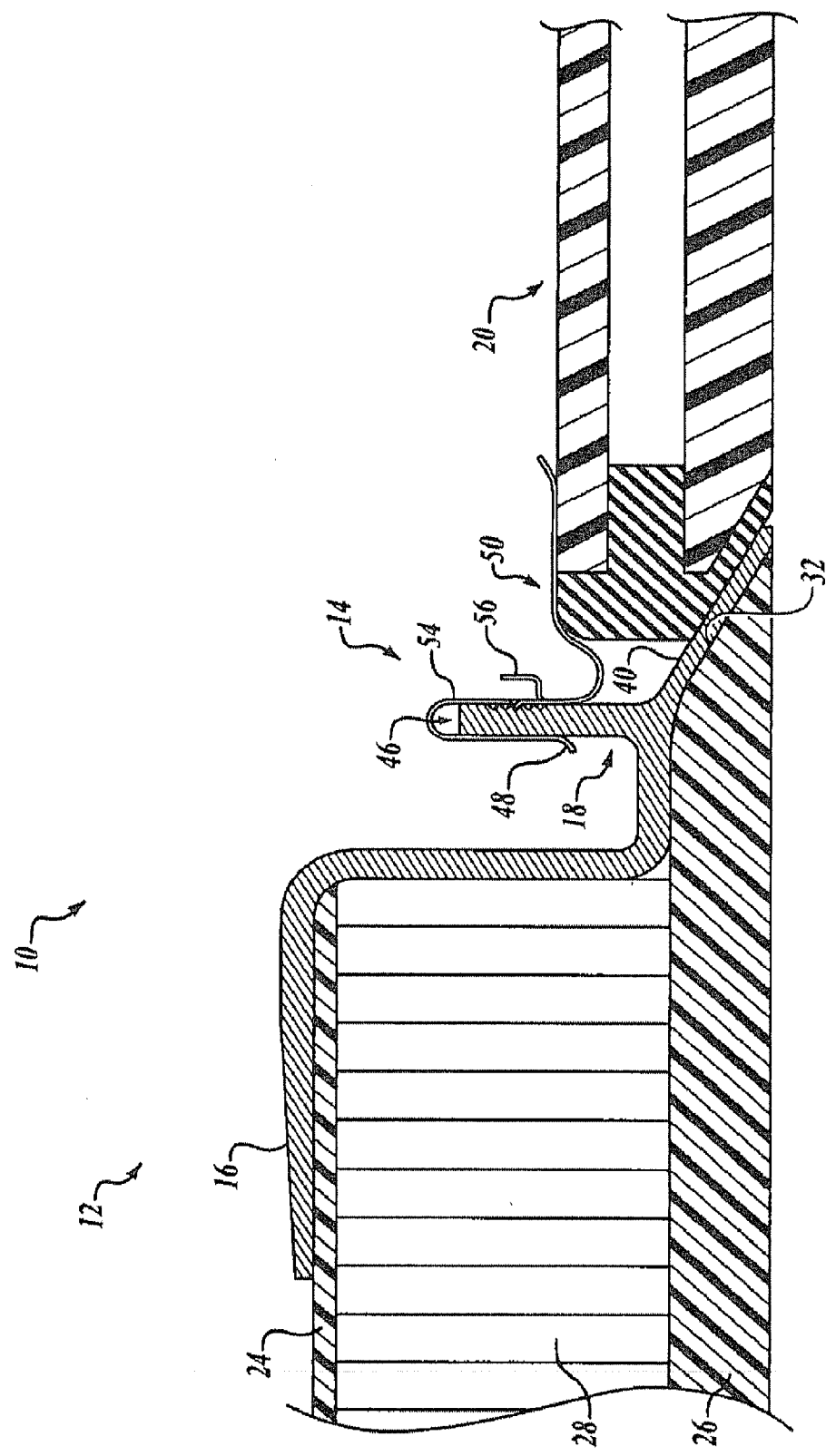
Figure 2C:
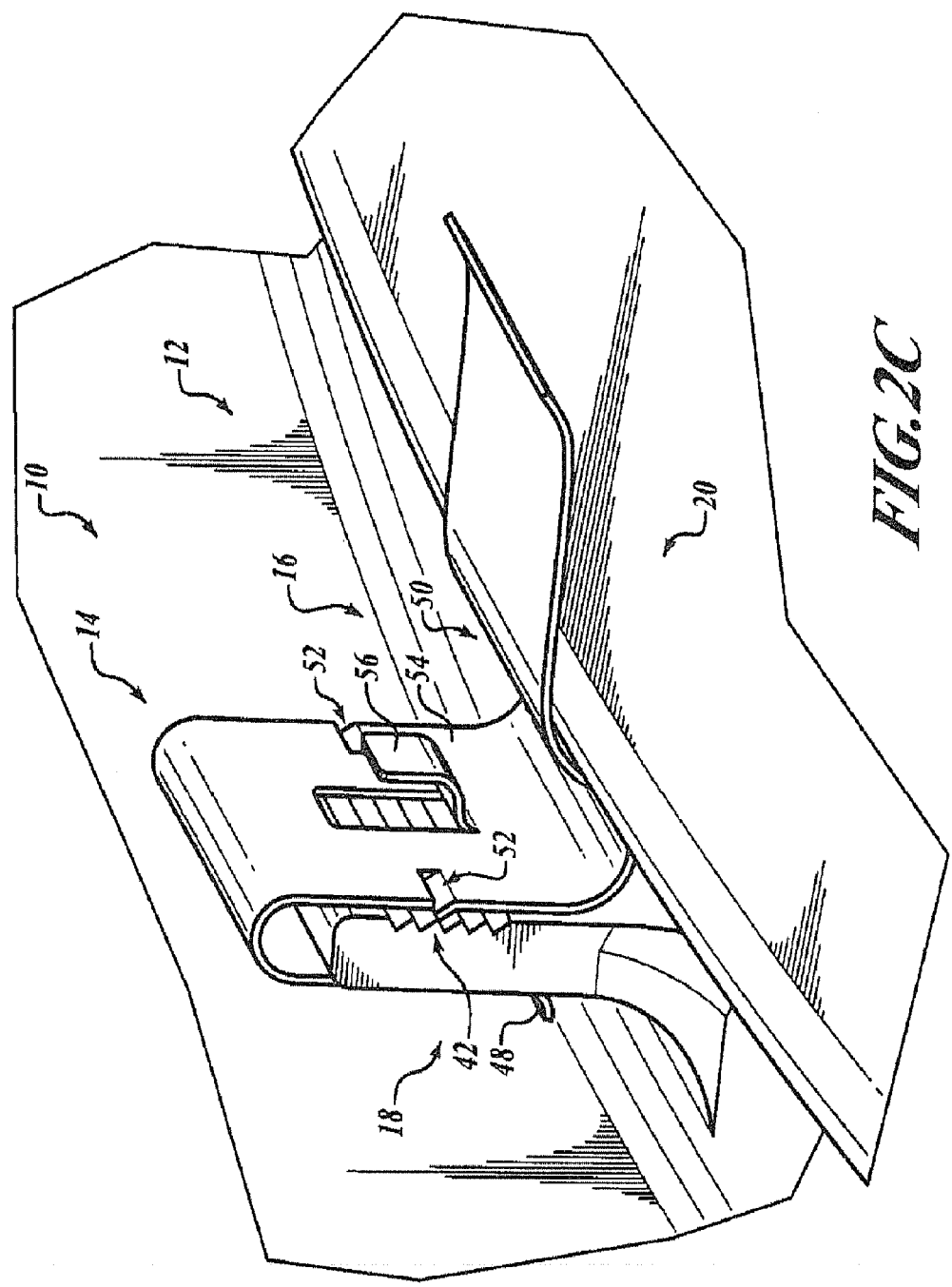

Referring additionally to FIGS. 2A, 2B, and 2C, the flanges 18 are substantially rectangular, upstanding projections that project from the internal side of the window frame body 16 approximately perpendicular to the inner skin 24 and the outer skin 26. The flanges 18 provide a means for aligning and holding the spring clips 14 that are used to retain the window assembly 20 in place against the sill 40. Any number of the flanges 18 may be provided as desired to retain the window assembly 20 in any particular application. The number of the flanges 18 that are used may depend, in part on factors such as size of the window assembly 20, size of the spring clips 14, associated loads, and the like. When the number of spring clips 14 is reduced and the spring clip 14 is installed to a height which does not fully compress the biasing portion 50, the inherent flexure in this spring attach mechanism additionally provides a means of absorbing blunt exterior impact against the window assembly 20, thereby minimizing damage to the window glazing material.

Integral with the window frame 12 are attachment features that help retain the installed window assembly 20 without the use of fasteners. To that end, each flange 18 provides a locking member 42 that is a means for releasably locking or engaging with the spring clip 14. In one exemplary, non-limiting embodiment, the locking member 42 may be provided as saw tooth grooves that are defined on a face 44 of the flange 18. Another exemplary embodiment will be discussed later.

The spring clips 14 are snapped into place over the attachment features (that is, the locking member 42) of the flanges 18 in such a manner as to hold the window assembly 20 firmly against the sill 40. The spring clip 14 includes an attachment portion 46 that receives therein the flange 18. An edge 48 may be curved, if desired, to aid in installation of the spring clip 14 over the flange 18. A biasing portion 50 is suitably shaped, such as by being bent downwardly towards the window assembly 20, to apply a preloaded pressure against the window assembly 20 when the spring clip 14 is fully installed and compressed.

Integral with the spring clip 14 are attachment features that, along with the attachment features of the flange 18, help retain the installed window assembly 20 without the use of fasteners. To that end, each spring clip 14 provides a locking member 52 that is a means for releasably locking or engaging with the flange 18. In one exemplary, non-limiting embodiment, the locking member 52 may be provided as a pair of angled tabs that extend from a face 54 of the attachment portion 46 of the spring clip 14. In this exemplary, non-limiting embodiment, the pair of dual angled tabs 52 retain the spring clip 14 in position against mating saw tooth grooves 42 of the flange 18. Another exemplary embodiment will be discussed later.

Figure 3:
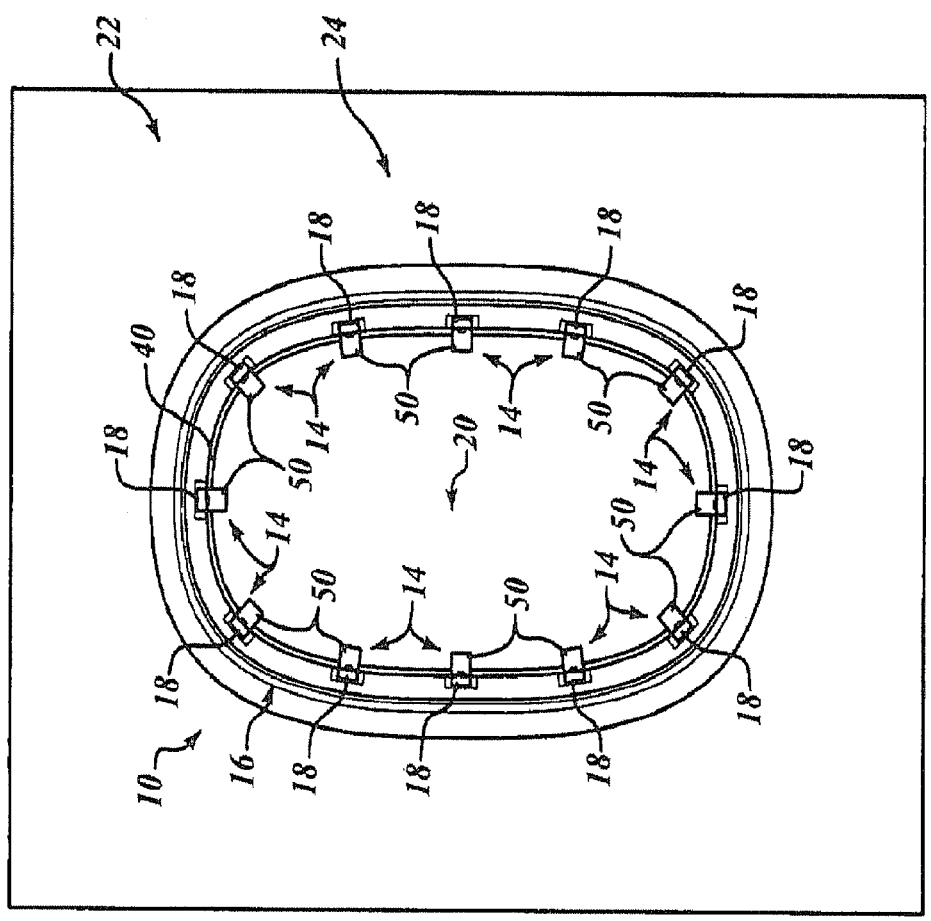
FIG. 3 is a plan view of the window frame assembly of FIG. 1.

Referring additionally to FIG. 3, once the window assembly 20 is placed in position on the sill 40 of the window frame 12, the spring clips 14 are installed over the flanges 18 and are depressed against the window assembly 20 to retain the window assembly 20 in position. The spring clip 14 is captured in position by the use of the locking members 42 and 52. In this exemplary, non-limiting embodiment, the pair of angled two locking tabs 52 interface or engage with the saw tooth grooves 42 on the face 44 of the flange 18. When the spring clip 14 is pressed down over the flange 18, the tabs 52 are angled such that they will snap over the saw tooth grooves 42 during installation until the spring clip 14 is fully compressed against the window assembly 20. After installation, the pair of angled tabs 52 are captured in the saw tooth grooves 42 and are unable to move back up the flange 18 (which would unload the compression on the spring clip 14). The biasing portion 50 applies a preloaded pressure against the window assembly 20 when the spring clip 14 is fully installed and compressed. To that end, when the structure 22 is an aircraft fuselage, use of some embodiments of window frame assemblies disclosed herein may help reduce weight by up to around a pound or so per installed window assembly over window assemblies installed in aircraft using conventional window frame assemblies. In aircraft having hundreds of window assemblies installed therein, use of some embodiments of window frame assemblies disclosed herein may help contribute to a total weight savings of up to hundreds of pounds or so, depending on the number of installed window assemblies.

Figure 4B:
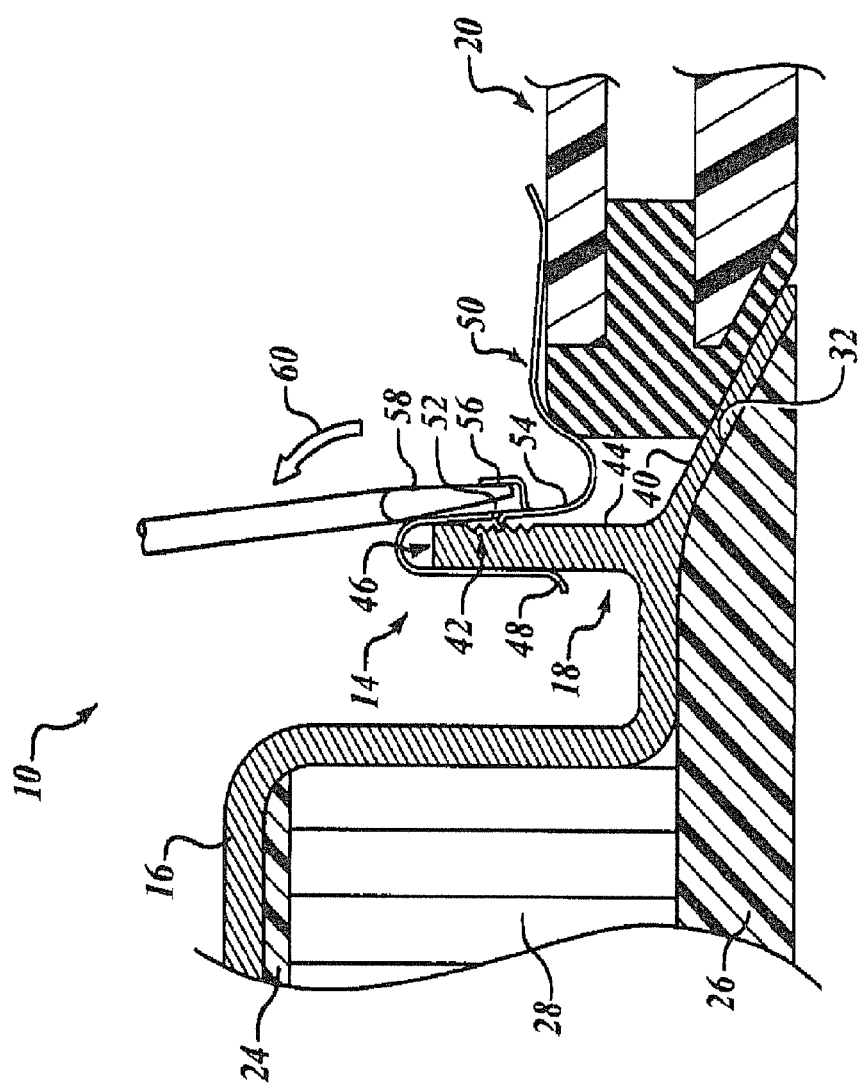

Referring additionally to FIGS. 4A, 4B, and 4C, the spring clip 14 includes a release member 56 to help in removal of the window assembly 20. For example, the release member 56 may be provided in the form of a tab that is fashioned in the face 54 of the spring clip 14. The release member 56, such as the tab, suitably is centered between the pair of locking members 52, such as the pair of angled tabs. The release member 56 provides a face such that a tool 58, such as a screwdriver, can be inserted to apply a force to rotate the face 54 of the spring clip 14. The face 54 of the spring clip 14 is rotatably pried open by the tool 58 as shown by arrows 60 to disengage the locking members 52, such as the pair of angled tabs of the spring clip 14, from the locking members 42, such as the saw tooth grooves of the flange 18. Upon disengaging the locking members 52, the spring clip 14 will unload the compression load stored against the window assembly 20 and allow for removal from the flange 18. Once all of the spring clips 14 are removed, the window assembly 20 is free to be removed.

Referring now to FIGS. 5A, 5B, and 5C, in another exemplary embodiment of a window frame assembly 10A, locking members 42A and 52A are similar to the locking members 42 and 52 (FIGS. 2A, 2B, and 2C), except the implementation of the type of locking members is reversed from the implementation illustrated in FIGS. 2A, 2B, and 2C. For example, a flange 18A provides as locking members 42A angled tabs that extend inwardly from the face 44. In this embodiment, a spring clip 14A provides saw tooth grooves 52A that extend outwardly from the face 54 (that is, away from the flange 18A). All other details of construction and operation of the window frame assembly 10A are the same as those set forth above for the window frame assembly 10 and need not be repeated for an understanding of the embodiment. Like reference numbers are used to refer to the same details.

Figure 6A:
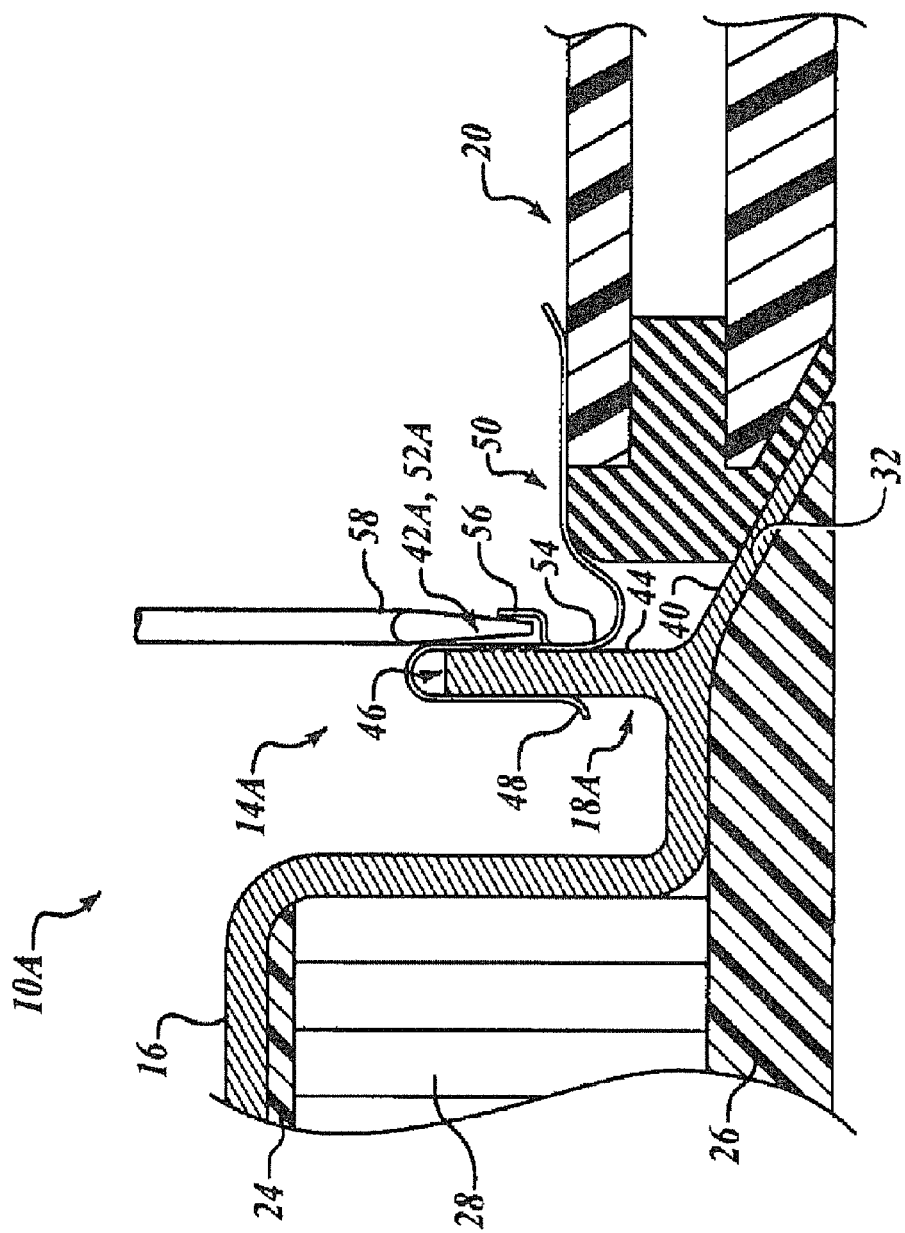
Figure 6B:
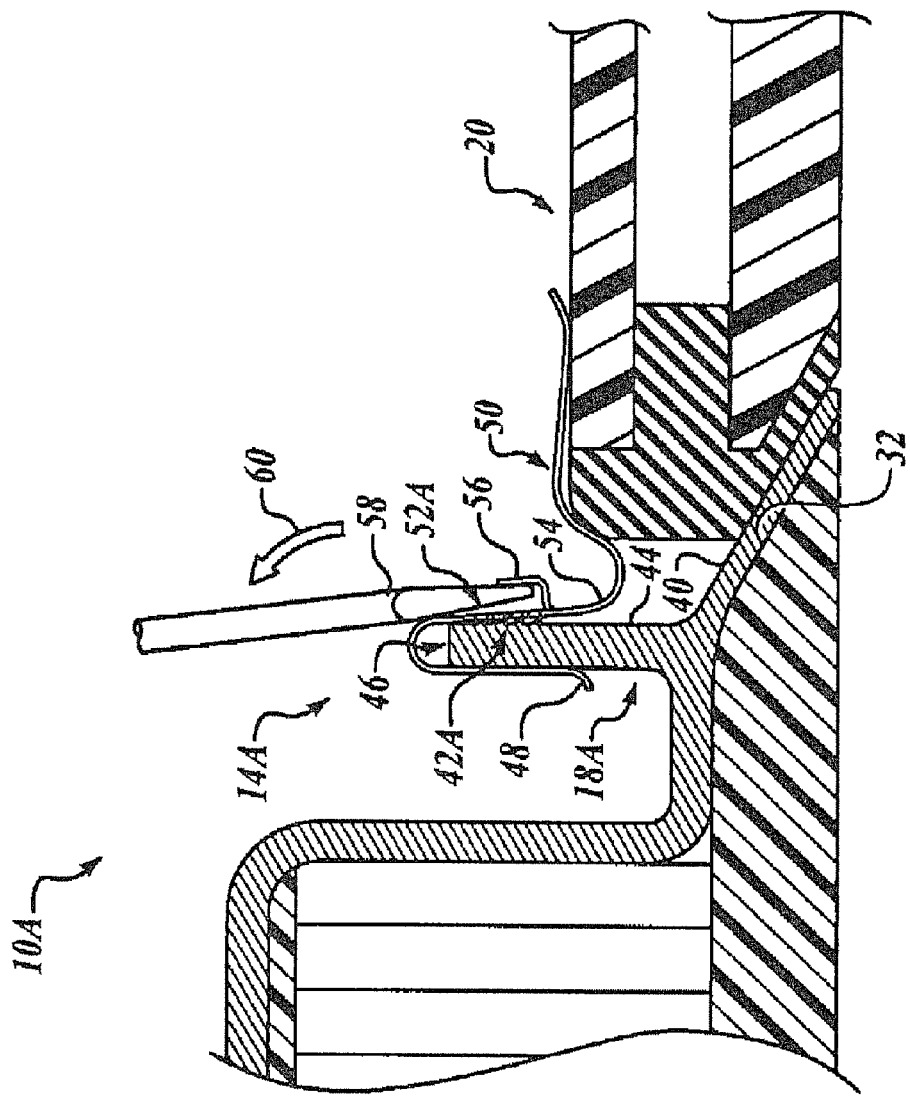

Referring now to FIGS. 6A, 6B, and 6C, the window assembly 20 is removed from the window frame assembly 10A in a similar manner as discussed above for the window frame assembly 10 (FIGS. 4A, 4B, and 4C). However, rotation of the face 54 of the spring clip 14A disengages the saw tooth grooves 52A of the spring clip 14A from the tabs 42A of the flange 18A. All other details of removal of the window assembly 20 from the window frame assembly 10A are the same as those discussed above for the window frame assembly 10 (FIGS. 4A, 4B, and 4C) and need not be repeated. Like reference numbers are used to refer to the same details.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true scope.

What is claimed is:

1. A method, comprising:
  installing a window assembly in a structure by:
    coupling a window frame body of the window assembly to a first surface of an interior side of an outer skin of the structure;
    coupling the window frame body to a second surface of an interior side of an inner skin of the structure; and
    coupling the window frame body to a portion of the structure between the outer skin and the inner skin.

2. The method of claim 1, wherein the window assembly includes a plurality of flanges, wherein each of the plurality of flanges defines at least one first locking member, the at least one first locking member adapted to retain a spring clip at a plurality of retained positions.

3. The method of claim 2, wherein the spring clip is configured to be disengaged from the at least one first locking member by rotating the spring clip away from a window installed in the window assembly.

4. The method of claim 1, wherein the portion of the structure between the outer skin and the inner skin includes a honeycomb material that is adhered to the window frame body.

5. The method of claim 1, wherein the structure includes a plurality of window cutouts, each of the window cutouts defining an outer aperture in the outer skin and an inner aperture in the inner skin, wherein the outer aperture is smaller than the inner aperture.

6. The method of claim 1, further comprising:
  installing a window in the window frame body; and
  installing at least one spring clip on a corresponding flange of the window frame body, wherein the at least one spring clip is installed on the corresponding flange to an adjustable height that does not fully compress a biasing member of the at least one spring clip, and wherein the at least one spring clip is configured to inhibit damage to the window by absorbing blunt exterior impacts against the window.

7. The method of claim 1, wherein the structure comprises an aircraft fuselage.

8. The method of claim 1, wherein the window assembly includes a plurality of flanges, wherein each of the plurality of flanges defines at least one first locking member; the method further comprising:
  installing a window in the window assembly;
  installing a plurality of spring clips onto the plurality of flanges to a first retained position, wherein each of the plurality of spring clips defines at least one second locking member configured to engage the at least one first locking member; and
  installing at least one spring clip of the plurality of spring clips onto at least one flange of the plurality of flanges to a second retained position.

9. The method of claim 8, wherein:
  the at least one first locking member includes a plurality of saw tooth grooves; and
  the at least one second locking member includes a pair of angled tabs;
  wherein, during installation of a first spring clip of the plurality of spring clips onto a first flange of the plurality of flanges, the pair of angled tabs of the first spring clip are moveable from a first retained position in a first of the saw tooth grooves to a second retained position in a second of the saw tooth grooves to achieve an installation position of the first spring clip relative to the first flange.

10. The method of claim 8, wherein:
  the at least one first locking member includes a pair of angled tabs; and
  the at least one second locking member includes a plurality of saw tooth grooves;
  wherein, during installation of a first spring clip of the plurality of spring clips onto a first flange of the plurality of flanges, the saw tooth grooves of the first spring clip are moveable from a first retained position where a first of the plurality of saw tooth grooves retains the pair of angled tabs to a second retained position where a second of the plurality of saw tooth grooves retains the pair of angled tabs to achieve an installation position of the first spring clip relative to the first flange.

11. The method of claim 8, wherein each of the plurality of spring clips defines a release mechanism configured to enable disengaging the spring clip from a corresponding flange.

12. The method of claim 11, wherein the release mechanism enables disengaging the spring clip by rotating the spring clip away from the window.

13. The method of claim 11, wherein the spring clip enables disengaging the spring clip from a corresponding flange by rotating the spring clip in a direction that unloads compression of a biasing portion of the spring clip.

14. The method of claim 11, wherein the release mechanism includes a tab.

15. The method of claim 11, wherein the release mechanism includes a face that enables a tool to be used to apply a force to rotate the spring clip to disengage the spring clip from the corresponding flange.

* * * * *